United States Patent
Stanev et al.

(10) Patent No.: US 7,543,302 B2
(45) Date of Patent: Jun. 2, 2009

(54) SYSTEM AND METHOD FOR SERIALIZING JAVA OBJECTS OVER SHARED CLOSURES

(75) Inventors: Georgi Stanev, Sofia (BG); Ivan T. Atanassov, Sofia (BG); Pavel Bonev, Sofia (BG)

(73) Assignee: SAP AG, Walldorf (DE)

( * ) Notice: Subject to any disclaimer, the term of this patent is extended or adjusted under 35 U.S.C. 154(b) by 365 days.

(21) Appl. No.: 11/024,552

(22) Filed: Dec. 28, 2004

(65) Prior Publication Data
US 2006/0155742 A1 Jul. 13, 2006

(51) Int. Cl.
*G06F 13/00* (2006.01)
(52) U.S. Cl. .......................... 719/312; 719/316; 718/1; 717/166
(58) Field of Classification Search .......... 719/312, 719/316; 718/1; 717/166
See application file for complete search history.

(56) References Cited

U.S. PATENT DOCUMENTS

| | | | |
|---|---|---|---|
| 7,165,239 B2 * | 1/2007 | Hejlsberg et al. ........... | 717/114 |
| 7,296,267 B2 | 11/2007 | Cota-Robles et al. | |
| 7,302,423 B2 | 11/2007 | De Bellis | |
| 2002/0078060 A1 | 6/2002 | Garst et al. | |
| 2003/0014521 A1 | 1/2003 | Elson et al. | |
| 2003/0084248 A1 | 5/2003 | Gaither et al. | |
| 2003/0177382 A1 | 9/2003 | Ofek et al. | |
| 2003/0212654 A1 | 11/2003 | Harper et al. | |
| 2004/0024971 A1 | 2/2004 | Bogin et al. | |
| 2004/0181537 A1 | 9/2004 | Chawla et al. | |
| 2005/0086656 A1* | 4/2005 | Whitlock et al. ............. | 718/1 |
| 2005/0216502 A1* | 9/2005 | Kaura et al. ............ | 707/103 R |
| 2005/0278346 A1 | 12/2005 | Shang et al. | |
| 2006/0053112 A1 | 3/2006 | Chitkara et al. | |
| 2006/0206856 A1 | 9/2006 | Breeden et al. | |

FOREIGN PATENT DOCUMENTS

WO    WO-00/23898    4/2000

OTHER PUBLICATIONS

Sun Microsystems, "Java Object Serialization", pp. 5, printed Nov. 10, 2004.
Davis, M., "Durable Java: Serialization", pp. 10, printed Dec. 1, 2004.
Canadian Mind Products, "Java Glossary: Serialization", pp. 8., printed Nov. 9, 2004.

(Continued)

*Primary Examiner*—Andy Ho
(74) *Attorney, Agent, or Firm*—Blakely Sokoloff Taylor & Zafman (57) ABSTRACT

A method is described that involves processing a shared closure by removing, from each non-shareable object in a closure, content that causes each of the non-shareable objects to be non-shareable. The method also involves serializing each of the non-shareable objects by removing the content that causes each of the non-shareable objects to be non-shareable. The method also entails de-serializing each of the non-shareable objects after receiving them from a shared memory. The method also entails comparing contents of each non-shareable object, and, determining whether each of the non-shareable objects contain equal content before the serialization and after the de-serialization.

15 Claims, 9 Drawing Sheets

OTHER PUBLICATIONS

Greanier, T., Discover the secrets of Java Serialization API:, pp. 7, Jul. 2000, printed Nov. 10, 2004.

Non-Final Office Action from U.S. Appl. No. 11/013,278, mailed Dec. 23, 2008, 28 pages.

Non-Final Office Action from U.S. Appl. No. 11/012,803, mailed Dec. 23, 2008, 22 pages.

Final Office Action from U.S. Appl. No. 11/013278, mailed Aug. 13, 2008, 16 pgs.

* cited by examiner

SYSTEM AND METHOD FOR SERIALIZING JAVA OBJECTS OVER SHARED CLOSURES

BACKGROUND

1. Field of the Invention

This invention relates generally to the field of data processing systems. More particularly, the invention relates to an improved system and method for serializing Java objects over shared closures within Java-based system architecture.

2. Description of the Related Art

In order for a data processing device such as a personal computer or personal information manager ("PIM") to display a particular alphanumeric character or group of characters, the alphanumeric character(s) must be installed on the data processing device. For example, in order for a data processing device to display non-English characters, such as the "é" character ("e" with an "accent egu"), a character set which includes those characters must first be installed on the data processing device.

BACKGROUND

Figure 1:
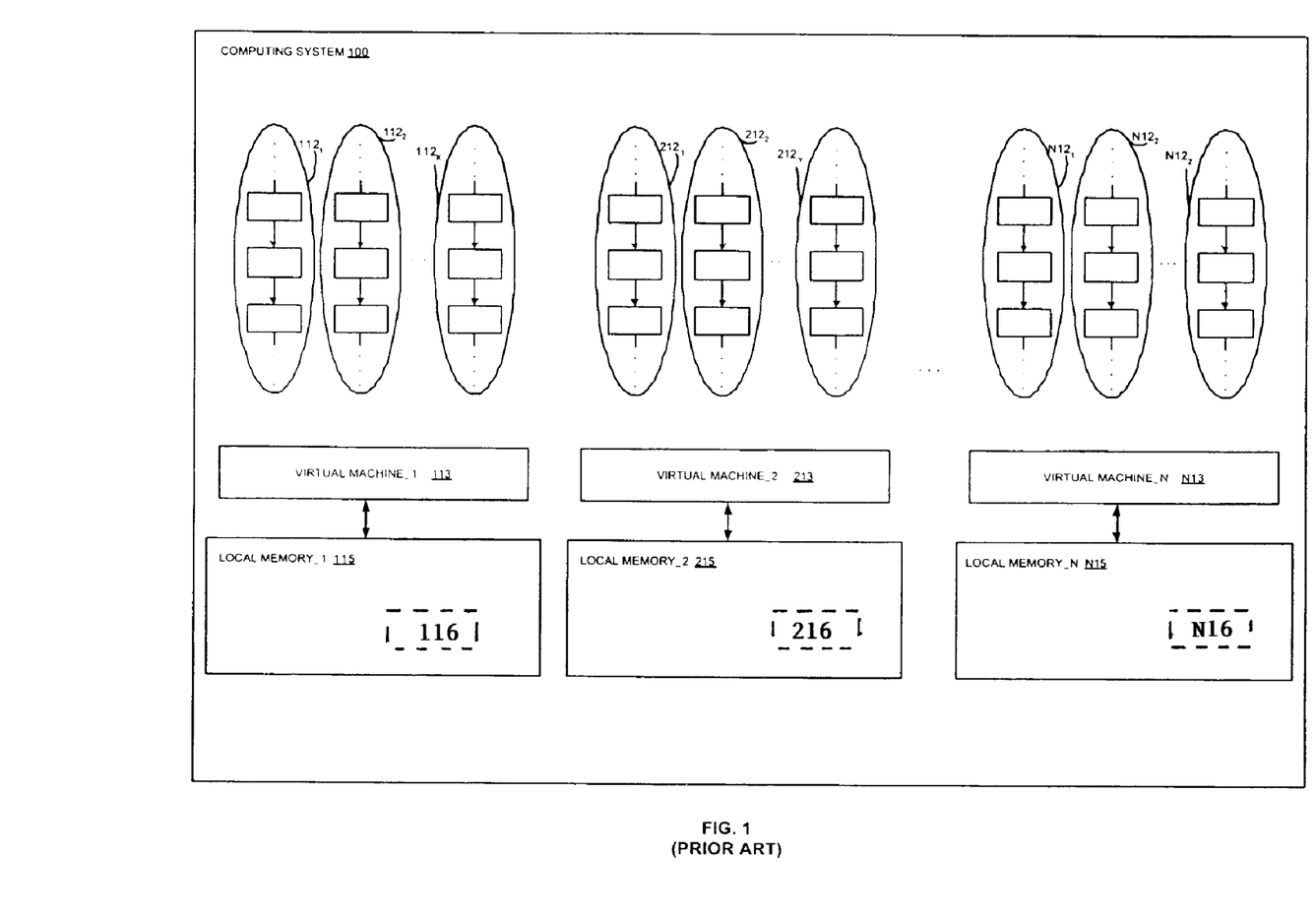
FIG. 1 illustrates a portion of a prior art computing system.

FIG. 1 shows a prior art computing system 100 having N virtual machines 113, 213, . . . N13. The prior art computing system 100 can be viewed as an application server that runs web applications and/or business logic applications for an enterprise (e.g., a corporation, partnership or government agency) to assist the enterprise in performing specific operations in an automated fashion (e.g., automated billing, automated sales, etc.).

The prior art computing system 100 runs are extensive amount of concurrent application threads per virtual machine. Specifically, there are X concurrent application threads ($112_1$ through $112_X$) running on virtual machine 113; there are Y concurrent application threads ($212_1$ through $212_Y$) running on virtual machine 213; . . . and, there are Z concurrent application threads ($N12_1$ through $N12_Z$) running on virtual machine N13; where, each of X, Y and Z are a large number.

A virtual machine, as is well understood in the art, is an abstract machine that converts (or "interprets") abstract code into code that is understandable to a particular type of a hardware platform. For example, if the processing core of computing system 100 included PowerPC microprocessors, each of virtual machines 113, 213 through N13 would respectively convert the abstract code of threads $112_1$ through $112_X$, $212_1$ through $212_Y$, and $N12_1$ through $N12_Z$ into instructions sequences that a PowerPC microprocessor can execute.

Because virtual machines operate at the instruction level they tend to have processor-like characteristics, and, therefore, can be viewed as having their own associated memory. The memory used by a functioning virtual machine is typically modeled as being local (or "private") to the virtual machine. Hence, FIG. 1 shows local memory 115, 215, N15 allocated for each of virtual machines 113, 213, . . . N13 respectively.

A portion of a virtual machine's local memory may be implemented as the virtual machine's cache. As such, FIG. 1 shows respective regions 116, 216, . . . N16 of each virtual machine's local memory space 115, 215, . . . N15 being allocated as local cache for the corresponding virtual machine 113, 213, . . . N13. A cache is a region where frequently used items are kept in order to enhance operational efficiency. Traditionally, the access time associated with fetching/writing an item to/from a cache is less than the access time associated with other place(s) where the item can be kept (such as a disk file or external database (not shown in FIG. 1)).

For example, in an object-oriented environment, an object that is subjected to frequent use by a virtual machine (for whatever reason) may be stored in the virtual machine's cache. The combination of the cache's low latency and the frequent use of the particular object by the virtual machine corresponds to a disproportionate share of the virtual machine's fetches being that of the lower latency cache; which, in turn, effectively improves the overall productivity of the virtual machine.

A problem with the prior art implementation of FIG. 1, is that, a virtual machine can be under the load of a large number of concurrent application threads; and, furthermore, the "crash" of a virtual machine is not an uncommon event. If a virtual machine crashes, generally, all of the concurrent application threads that the virtual machine is actively processing will crash. Thus, if any one of virtual machines 113, 213, N13 were to crash, X, Y or Z application threads would crash along with the crashed virtual machine. With X, Y and Z each being a large number, a large number of applications would crash as a result of the virtual machine crash.

Given that the application threads running on an application server 100 typically have "mission critical" importance, the wholesale crash of scores of such threads is a significant problem for the enterprise.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Figure 2:
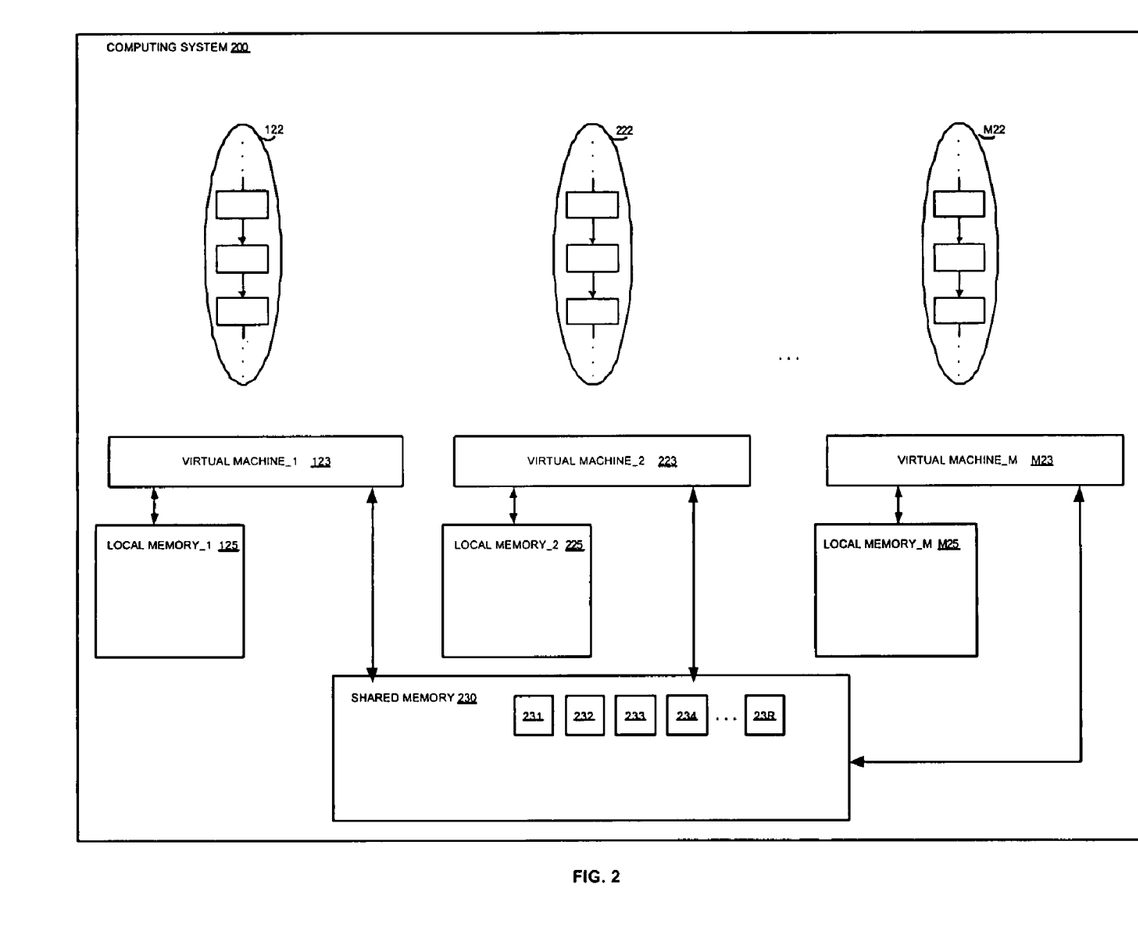
FIG. 2 illustrates a portion of an improved computing system.

FIG. 2 shows a computing system 200 that is configured with less application threads per virtual machine than the prior art system of FIG. 1. Less application threads per virtual machine results in less application thread crashes per virtual machine crash; which, in turn, should result in the new system 200 of FIG. 2 exhibiting better reliability than the prior art system 100 of FIG. 1.

According to the depiction of FIG. 2, which is an extreme representation of the improved approach, only one application thread exists per virtual machine (specifically, thread 122 is being executed by virtual machine 123; thread 222 is being executed by virtual machine 223; ... and, thread M22 is being executed by virtual machine M23). In practice, the computing system 200 of FIG. 2 may permit a limited number of threads to be concurrently processed by a single virtual machine rather than only one.

In order to concurrently execute a comparable number of application threads as the prior art system 100 of FIG. 1, the improved system 200 of FIG. 2 instantiates more virtual machines than the prior art system 100 of FIG. 1. That is, M>N.

Thus, for example, if the prior art system 100 of FIG. 1 has 10 application threads per virtual machine and 4 virtual machines (e.g., one virtual machine per CPU in a computing system having four CPUS) for a total of 4×10=40 concurrently executed application threads for the system 100 as a whole, the improved system 200 of FIG. 2 may only permit a maximum of 5 concurrent application threads per virtual machine and 6 virtual machines (e.g., 1.5 virtual machines per CPU in a four CPU system) to implement a comparable number (5×6=30) of concurrently executed threads as the prior art system 100 in FIG. 1.

Here, the prior art system 100 instantiates one virtual machine per CPU while the improved system 200 of FIG. 2 can instantiate multiple virtual machines per CPU. For example, in order to achieve 1.5 virtual machines per CPU, a first CPU will be configured to run a single virtual machine while a second CPU in the same system will be configured to run a pair of virtual machines. By repeating this pattern for every pair of CPUs, such CPU pairs will instantiate 3 virtual machines per CPU pair (which corresponds to 1.5 virtual machines per CPU).

Recall from the discussion of FIG. 1 that a virtual machine can be associated with its own local memory. Because the improved computing system of FIG. 2 instantiates more virtual machines that the prior art computing system of FIG. 1, in order to conserve memory resources, the virtual machines 123, 223, ... M23 of the system 200 of FIG. 2 are configured with less local memory space 125, 225, ... M25 than the local memory 115, 215, ... N15 of virtual machines 113, 213, ... N13 of FIG. 1. Moreover, the virtual machines 123, 223, ... M23 of the system 200 of FIG. 2 are configured to use a shared memory 230. Shared memory 230 is memory space that contains items that can be accessed by more than one virtual machine (and, typically, any virtual machine configured to execute "like" application threads that is coupled to the shared memory 230).

Thus, whereas the prior art computing system 100 of FIG. 1 uses fewer virtual machines with larger local memory resources containing objects that are "private" to the virtual machine; the computing system 200 of FIG. 2, by contrast, uses more virtual machines with less local memory resources. The less local memory resources allocated per virtual machine is compensated for by allowing each virtual machine to access additional memory resources. However, owing to limits in the amount of available memory space, this additional memory space 230 is made "shareable" amongst the virtual machines 123, 223, ... M23.

According to an object oriented approach where each of virtual machines 123, 223, ... N23 does not have visibility into the local memories of the other virtual machines, specific rules are applied that mandate whether or not information is permitted to be stored in shared memory 230. Specifically, to first order, according to an embodiment, an object residing in shared memory 230 should not contain a reference to an object located in a virtual machine's local memory because an object with a reference to an unreachable object is generally deemed "non useable".

That is, if an object in shared memory 230 were to have a reference into the local memory of a particular virtual machine, the object is essentially non useable to all other virtual machines; and, if shared memory 230 were to contain an object that was useable to only a single virtual machine, the purpose of the shared memory 230 would essentially be defeated.

In order to uphold the above rule, and in light of the fact that objects frequently contain references to other objects (e.g., to effect a large process by stringing together the processes of individual objects; and/or, to effect relational data structures), "shareable closures" are employed. A "closure" is a group of one or more objects where every reference stemming from an object in the group that references another object does not reference an object outside the group. That is, all the object-to-object references of the group can be viewed as closing upon and/or staying within the confines of the group itself. Note that a single object without any references stemming from can be viewed as meeting the definition of a closure.

If a closure with a non shareable object were to be stored in shared memory 230, the closure itself would not be shareable with other virtual machines, which, again, defeats the purpose of the shared memory 230. Thus, in an implementation, in order to keep only shareable objects in shared memory 230 and to prevent a reference from an object in shared memory 230 to an object in a local memory, only "shareable" (or "shared") closures are stored in shared memory 230. A "shared closure" is a closure in which each of the closure's objects are "shareable".

A shareable object is an object that can be used by other virtual machines that store and retrieve objects from the shared memory 230. As discussed above, in an embodiment, one aspect of a shareable object is that it does not possess a reference to another object that is located in a virtual machine's local memory. Other conditions that an object must meet in order to be deemed shareable may also be effected. For example, according to a particular Java embodiment, a shareable object must also posses the following characteristics: 1) it is an instance of a class that is serializable; 2) it is an instance of a class that does not execute any custom serializing or deserializing code; 3) it is an instance of a class whose base classes are all serializable; 4) it is an instance of a class whose member fields are all serializable; 5) it is an instance of a class that does not interfere with proper operation of a garbage collection algorithm; 6) it has no transient fields; and, 7) its finalize ( ) method is not overwritten.

Exceptions to the above criteria are possible if a copy operation used to copy a closure into shared memory 230 (or from shared memory 230 into a local memory) can be shown to be semantically equivalent to serialization and deserialization of the objects in the closure. Examples include instances of the Java 2 Platform, Standard Edition 1.3 java.lang.String class and java.util.Hashtable class.

A container is used to confine/define the operating environment for the application thread(s) that are executed within the container. In the context of J2EE, containers also provide a family of services that applications executed within the container may use (e.g., (e.g., Java Naming and Directory Interface (JNDI), Java Database Connectivity (JDBC), Java Messaging Service (JMS) among others).

Different types of containers may exist. For example, a first type of container may contain instances of pages and servlets for executing a web based "presentation" for one or more applications. A second type of container may contain granules of functionality (generically referred to as "components" and, in the context of Java, referred to as "beans") that reference one another in sequence so that, when executed according to the sequence, a more comprehensive overall "business logic" application is realized (e.g., stringing revenue calculation, expense calculation and tax calculation components together to implement a profit calculation application).

Figure 3:
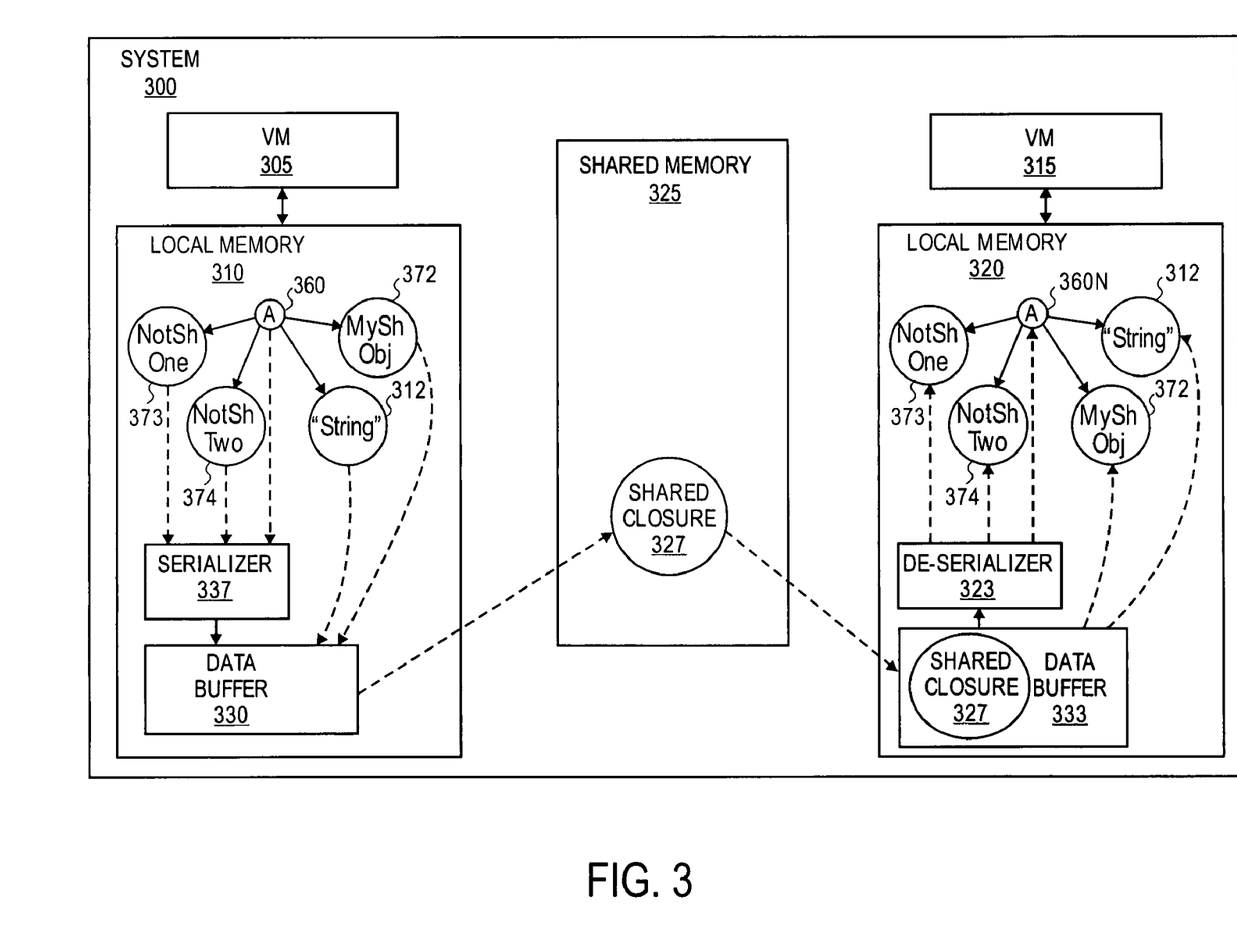
FIG. 3 illustrates a system where both shareable and non-shareable objects are copied to a data buffer and pushed to shared memory.

FIG. 3 shows that more than one thread can be actively processed by the virtual machine 323 depicted therein. It should be understood that, in accordance with the discussion concerning FIG. 2, the number of threads that the virtual machine 323 can concurrently entertain should be limited (e.g., to some fixed number) to reduce the exposure to a virtual machine crash. For example, according to one implementation, the default number of concurrently executed threads is 5. In a further implementation, the number of concurrently executed threads is a configurable parameter so that, conceivably, for example, in a first system deployment there are 10 concurrent threads per virtual machine, in a second system deployment there are 5 concurrent threads per virtual machine, in a third system deployment there is 1 concurrent thread per virtual machine. It is expected that a number of practical system deployments would choose less than 10 concurrent threads per virtual machine.

Object Serialization

In component-based system architectures, such as Java 2 Enterprise Edition (hereinafter "J2EE"), objects can be moved from one location to another, through the use of serialization. A specific type of object that may be serialized are session objects, which are objects that store session information of existing client sessions. One reason for moving such objects from one location to another is for backup protection of objects. If a computing system is processing objects in a production environment, and the computing system were to crash, all the objects (and the current client sessions) could be lost. Copying the objects from local memory to another location allows for backup of these objects to protect against an unexpected system crash. That is, objects could be moved from the local memory of a virtual machine (hereinafter "VM") to a magnetic drive on a backend storage server.

Another reason for moving objects out of local memory to another location is to free up local memory. Objects that have not been used recently may free up local memory by being moved from local memory to a backend storage server. When the object is needed again, it is moved back to local memory from the storage location.

A common method for moving an object from one location to another (e.g., local memory to a magnetic drive) is known as object serialization. Object serialization is a process of writing the state of an object to a byte stream, whereas deserialization is the process of rebuilding the object from the bytes stream. Once the object is serialized it can be sent across a network to any remote destination (e.g., to a magnetic drive). Within J2EE, serialization is possible through the Java Serialization API, which provides a standard mechanism to handle object serialization.

There are advantages in avoiding serialization of objects as a means of moving objects from local memory. First, object serialization can be a timely process. An object must be serialized from its existing object structure into its serial byte-stream. This process takes time. Further, detailed information is added to the byte stream, beyond just the data contained within the object. Such information includes the structure of the object and how to rebuild it (i.e., deserialize) later on without any additional assistance. Depending on the original size of an object, this extra information can greatly increase the overall size (e.g., from 23 bytes to 200 bytes for an increase in size of 870%). The smaller an object is, the greater its increase in size due to serialization.

Another advantage in avoiding serialization is network dependency. It may be assumed, in many instances, that once an object has been serialized, it is likely to be moved to a different physical computing system. This seems evident if the purpose of moving an object is to protect it against a local system crash. If an object is being moved to a different physical system, the object usually travels across a network of some type. Network bandwidth and current traffic can affect the speed at which an object is moved. If network traffic is high, the transmitting of objects may become unacceptably slow.

An alternative to object serialization is the use of a shared memory and shared closures as described earlier. The use of a shared memory allows for the placing of an object or a group of objects (e.g., a shared closure) into a shared memory, such that multiple VMs may access the object. In such an environment, a single VM may contain a specific object within its local memory. The object could be pushed to a shared memory thereby allowing other VMs running on the same server to access the object. Such a system allows for fail-over protection of the object. If the VM who originally hosted the object were to crash, another VM would be able to recover the object from shared memory and replace the crashed VM.

Using shared memory and a shared closure instead of serialization improves over the disadvantages of serialization described above. In order to use a shared memory, the object or related objects are supposed to be in the form of a shared closure. As described above, there are limitations as to how an object or group of objects may become a shared closure. First, in order for a closure to be "shareable", each object in the closure must be "shareable".

Objects are not shareable if they contain custom serialization. Custom serialization can exist in some objects where the use of the Standard Java Serialization API is insufficient to serialize an object. For example, the standard Java serializer cannot serialize transient fields, so custom serialization may be required for such fields.

Further, an object cannot be shareable if it contains transient fields, since such fields are understandable only to the local VM. Further still, an object cannot be shareable if it contains a reference to a non-shareable object.

At any time there may be many shared closure "opportunity losses" because many closures are apt to have at least one object having a characteristic that prevents it from being shareable (e.g., transient fields, custom serialization and/or reference to a non shareable object); which, in turn, results in the object's closure failing to be a shared closure.

A solution is needed that allows for a non-shareable closure, containing a non-shareable object, to "effectively" become a shared closure and gain the use of a shared memory. Such a solution could avoid the exclusive use of serialization and allow for the use of shared memory at least to back up objects.

An Exemplary System for Java Object Serialization of Shared Closures

The system in FIG. 3 provides for the transformation of a closure having non-shareable objects into an effective shared closure so that it may be passed from the local memory of a VM into a shared memory. Once in shared memory, the closure can further be read into the local memory of another VM.

In system 300 there exists a first VM 305 with a local memory 310 and a second VM 315 with a local memory 320. There also exists a shared memory 325, which VM 305 and VM 315 can both access. The local memory of each VM also contains a data buffer, which is a shareable object. Objects are temporarily placed in the data buffer upon their being written to an output stream for entry into shared memory. Further, when an object is pushed from a shared memory to another local VM, via an input stream, the object will first appear in the data buffer of the "pushed-to" VM's local memory. In this example, local memory 310 contains data buffer 330 and local memory 320 contains data buffer 340.

In local memory 310, there exists an object A 360, which contains primitive fields, and references to four other objects, both shareable and non-shareable. Two of the shareable objects referenced by object A 360 are: String object 312 and MyShObj object 372. Object A 360 also references two non-shareable objects: NotShOne 373 and NotShTwo 374. Object NotShOne 373 is non-shareable because it contains a transient field. Object NotShTwo 374 is also non-shareable because it contains a custom serialization method.

Together the five objects form a non-shareable closure due to object A 360 referencing non-shareable objects. In order to push all five objects to shared memory 325, the objects must first be placed into data buffer 330, which is located within local memory 310. Since some of the objects are shareable, they may be pushed directly to data buffer 330. This will be described in more detail below.

Since object A 360, NotShOen 373, and NotShTwo 374 are non-shareable, some processing must be performed upon them in order to effectively convert them into "shareable" material before placement into data buffer 330. Since data buffer 330 is a shareable object, it is unable to hold non-shareable objects. In order for non-shareable objects to be copied to data buffer 330, they are first passed through serializer 337, which operates from local memory 310. Serializer 337 is responsible for decomposing non-shareable objects into shareable objects by removing the non-shareable data.

Figure 4A:
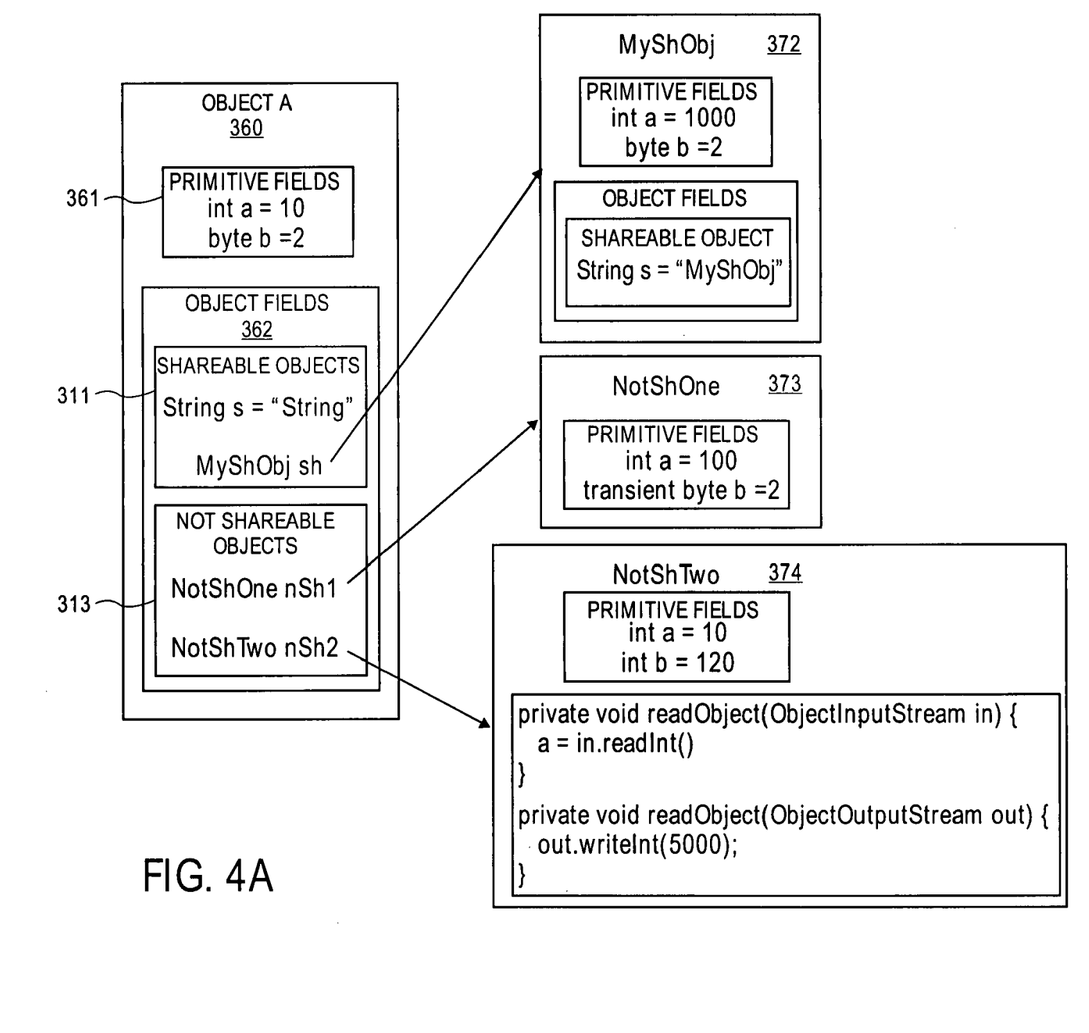
FIG. 4A illustrates the contents of a non-shareable object before being serialized and moved to a shared memory.

FIG. 4A illustrates, the example of FIG. 3 in more detail. FIG. 4A shows the detailed contents of Object "A" 360 including its primitive fields and its shareable and non-shareable object fields. Object fields contain one or more references to one or more other respective objects (e.g., String object 312, MyShObj 372, NotShOne 373, and NotShTwo 374). As described above, object A 360 comprises primitive fields 361 (int a=10; and byte b=2). Object A 360 also comprises two shareable object fields 311 (String s="String"; and MyShObj sh). To comply with the requirements of shared closures, a reference to objects (String and MyShObj) requires that the objects be included in the closure. As such, String object 312 and MyShObj 372 are shown as their own objects. String Object 312 comprises a single field "String". MyShObj comprises primitive fields (int a=1000; and byte b=20) as well as a shareable object field (String s="MyShObj").

Object A 360 also comprises two non-shareable object fields 313 (NotShOne nSh1; and NotShTwo nSh2). Again, to comply with the requirements of shared closures, a reference to objects (NotShOne; and NotShTwo) requires that the objects be included in the closure. NotShOne 373 comprises primitive fields (int a=100; and transient byte b=2). Transient byte b causes NotShOne 373 to be non-shareable and hence Object A 360 as a whole is non-shareable. NotShTwo 374 also comprises primitive fields (int a=10; and int b=120) as well as custom serialization. The custom serialization causes NotShTwo 374 to be non-shareable and hence Object A 360 as a whole is non-shareable.

Figure 5A:
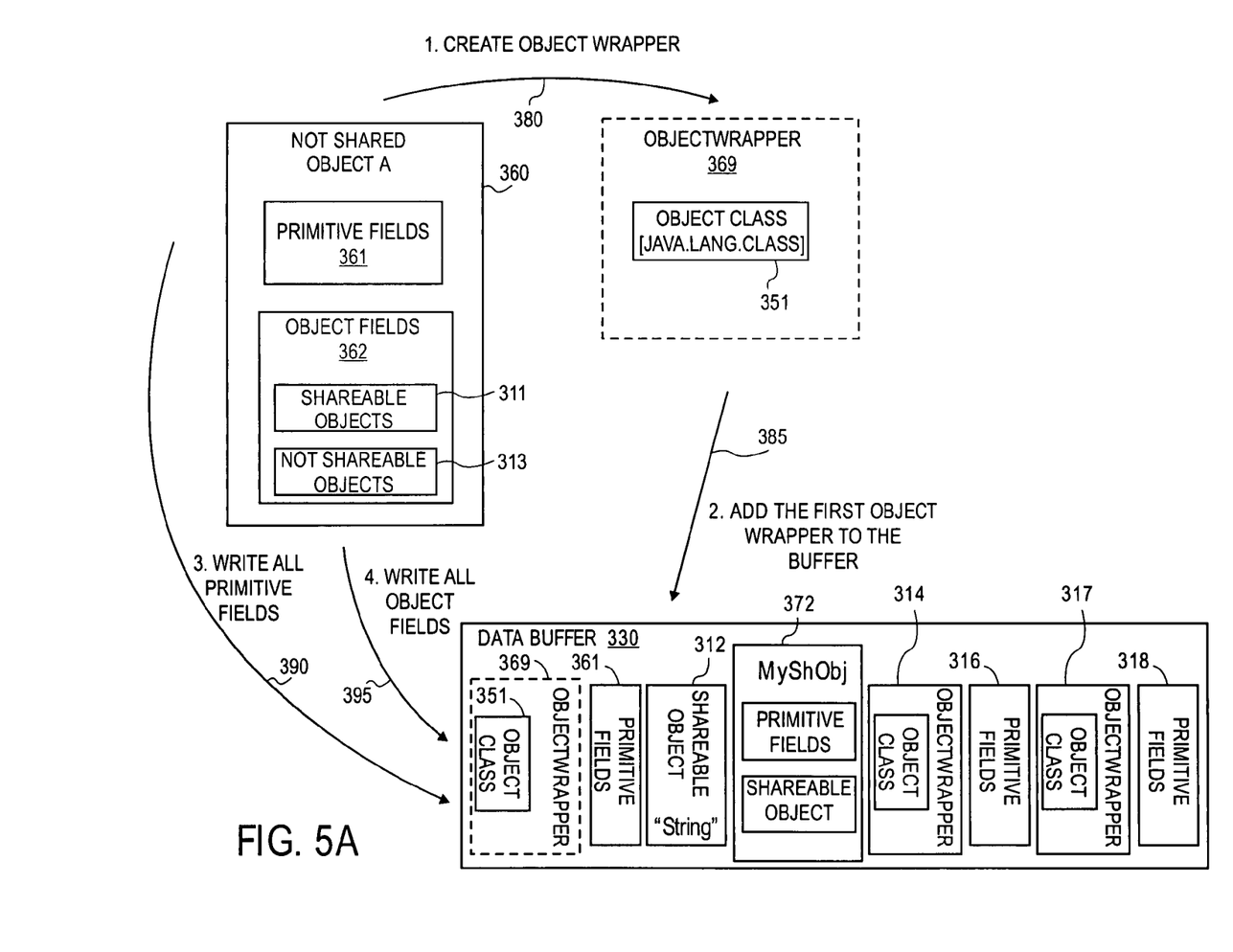
FIG. 5A illustrates the process by which a non-shareable object is taken from a local memory and serialized into in a data buffer.

FIG. 5A illustrates a process by which a non-shareable object may be placed into a data buffer as a shareable object. Object A 360 is comprised of primitive fields 361 and object fields 362 (as described in FIG. 4A). Knowing that object A 360 is not shareable, an object wrapper of object A 360 is created 380 and stored 385 in data buffer 330. This object wrapper 369 keeps the object class 351 (e.g., java.lang.Class) of object A 360, which is needed later to recreate Object A when it is moved to another VM. Once object wrapper 369 is added to data buffer 330, all the primitive fields 361 from object A 360 are written 390 to data buffer 330. Note, primitive fields 361 are not stored within object wrapper 369, but they are their own entity.

Then, both the shareable and non-shareable object fields (and the objects they reference) are written 395 to data buffer 330, as their own entities. Beginning with the shareable object fields 311, string object 312 is copied over to data buffer 330 as its own entity. Next, shareable object MyShObj 372 is copied over to data buffer 330 as its own entity.

Once the shareable objects 311 are written 395 to data buffer 330, the non-shareable objects 313 must be serialized and stored 395 in data buffer 330. Because non-shareable objects 313 are inherently non-shareable, serializer 337 will serialize and write them into data buffer 330 field by field. Beginning with NotShOne 373, an object wrapper 314 is created and stored in data buffer 330. Object wrapper 314 keeps the class information of object NotShOne 373 intact, so it may be recreated when sent to another VM. Once object wrapper 314 is created, the primitive fields 316 of NotShOne 373 are stored in data buffer 330. As described above, byte b is a transient field, which is essentially the matter that causes NotShOne 373 to be non-shareable, so it is not serialized and stored in data buffer 330. Instead, only int a is serialized into data buffer 330. (Note: object wrapper 314 contains a field type for byte b, but its value will not be carried over because it is transient. Instead a value of "0" will be placed in this field upon its de-serialization later on.)

Lastly, NotShTwo 374 begins its serialization by having object wrapper 317 created and placed in data buffer 330. Object wrapper 317 keeps the class information of object NotShTwo 374 intact, so it may be recreated when sent to another VM. As mentioned above, NotShTwo 374 has a custom serialization method called writeObject( ). In order to adhere to the Java serialization specification, serializer 337 should invoke this method to allow the custom serialization method to perform the serialization of NotShTwo 374 in preparation for the object's storage in data buffer 330, instead of allowing serializer 337 to directly write the primitive fields to data buffer 330. As shown in FIG. 4A, the writeObject( ) method of NotShTwo 374 writes an integer value (int 5000), which should be stored directly to data buffer 330 as primitive fields 318.

Returning to FIG. 3, Data buffer 330 now contains all the components of the five objects that originally existed in local memory 310. There are many separate entities (shown in data buffer 330 from FIG. 5A) that comprise object A 360 and the objects it references including: object wrapper 369 (which contains the object class 351 of object A 360); primitive fields 361 of object A 360; String Object 312; MyShObj 372; object wrapper 314 (which contains the object class of object NotShOne 373); primitive field 316 of NotShOne 373; object wrapper 317 (which contains the object class of object NotShTwo 374); and primitive fields 318 of NotShTwo 374. At this point data buffer 330 is a shareable object, since all of its contents are also shareable. In order to push the contents of data buffer 330 to shared memory 325, they are carried through a shared output stream. The structure of this stream comprises both the data buffer 330, and its contents, and the object serializer 337.

Once A 360 and its referenced objects reside in shared memory 325, as shared closure 327, the objects are capable of being copied to other VMs in system 300. In this example, VM 315 wants to copy shared closure 327 to its local memory 320. In order to do so, the objects shall first be placed in data buffer 333 of local memory 320. A similar process is followed as was used to move object A 360 and its referenced objects from VM 305 to shared memory 325. In order to push shared closure 327 from shared memory 325 to data buffer 333, the closure is carried through a shared input stream. The structure of this stream comprises both the data buffer 330 from VM 305, and its contents, and the object serializer 337.

At this point, object A 360 and its referenced objects are in data buffer 333. It contents can be seen in FIG. 5B which comprises: object wrapper 369 (which contains the object class 351 of object A 360); primitive fields 361 of object A 360; String Object 312; MyShObj 372; object wrapper 314 (which contains the object class of object NotShOne 373); primitive field 316 of NotShOne 373; object wrapper 317 (which contains the object class of object NotShTwo 374); and primitive fields 318 of NotShTwo 374. In order to reconstruct these objects into local memory 320, the non-shareable objects must pass through de-serializer 323. First, object wrapper 369 is read 382 from buffer 333. Based on the contents of object class 351, a new object 360N is created 383 in local memory 320. By using class 351 stored in object wrapper 369, it is possible to obtain the class descriptor object for this class (e.g., java.ioObjectStreamClass). From the information contained in the class descriptor, the object is created and placed in local memory 320. At this point, the new object 360N only contains its structure based on the class descriptor. No data is present. Next, object 360N reads 384 the primitive fields 361 from data buffer 333. These primitive fields 361 are now populated in object 360N as int a and byte b. This can be seen in FIG. 4B which shows the detailed contents of object 360N.

Figure 4B:
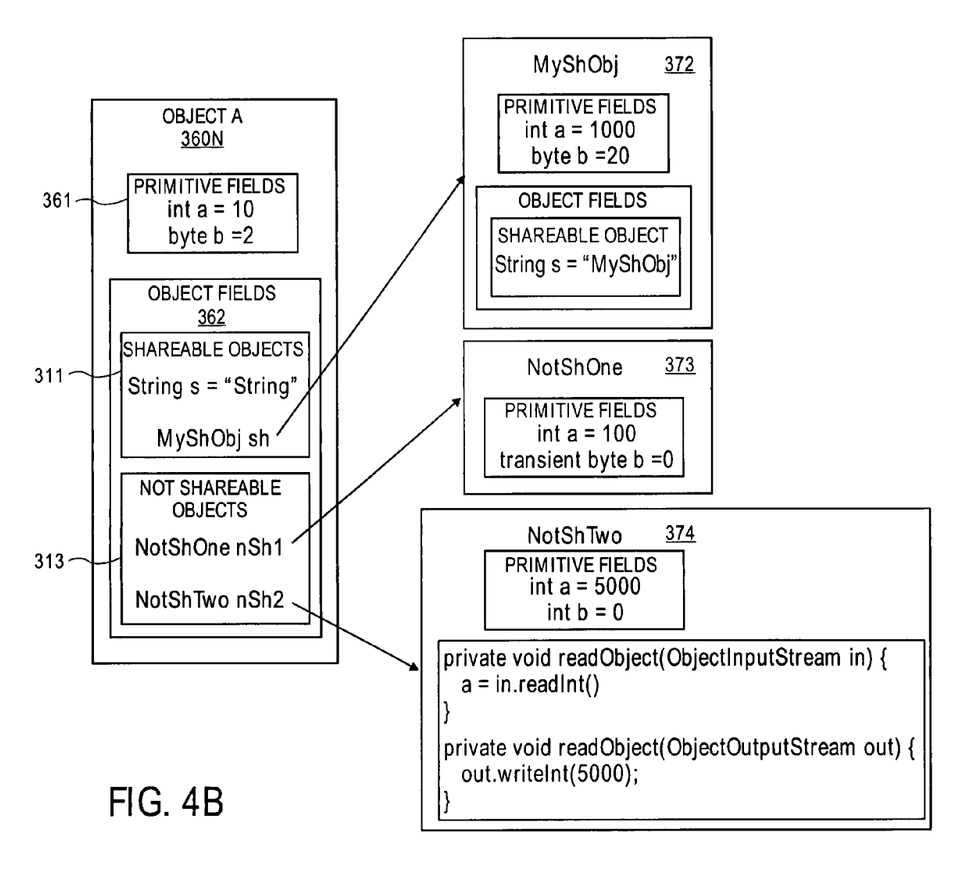
FIG. 4B illustrates the contents of a non-shareable object after being moved from a shared memory and de-serialized into to a second VM.
Figure 5B:
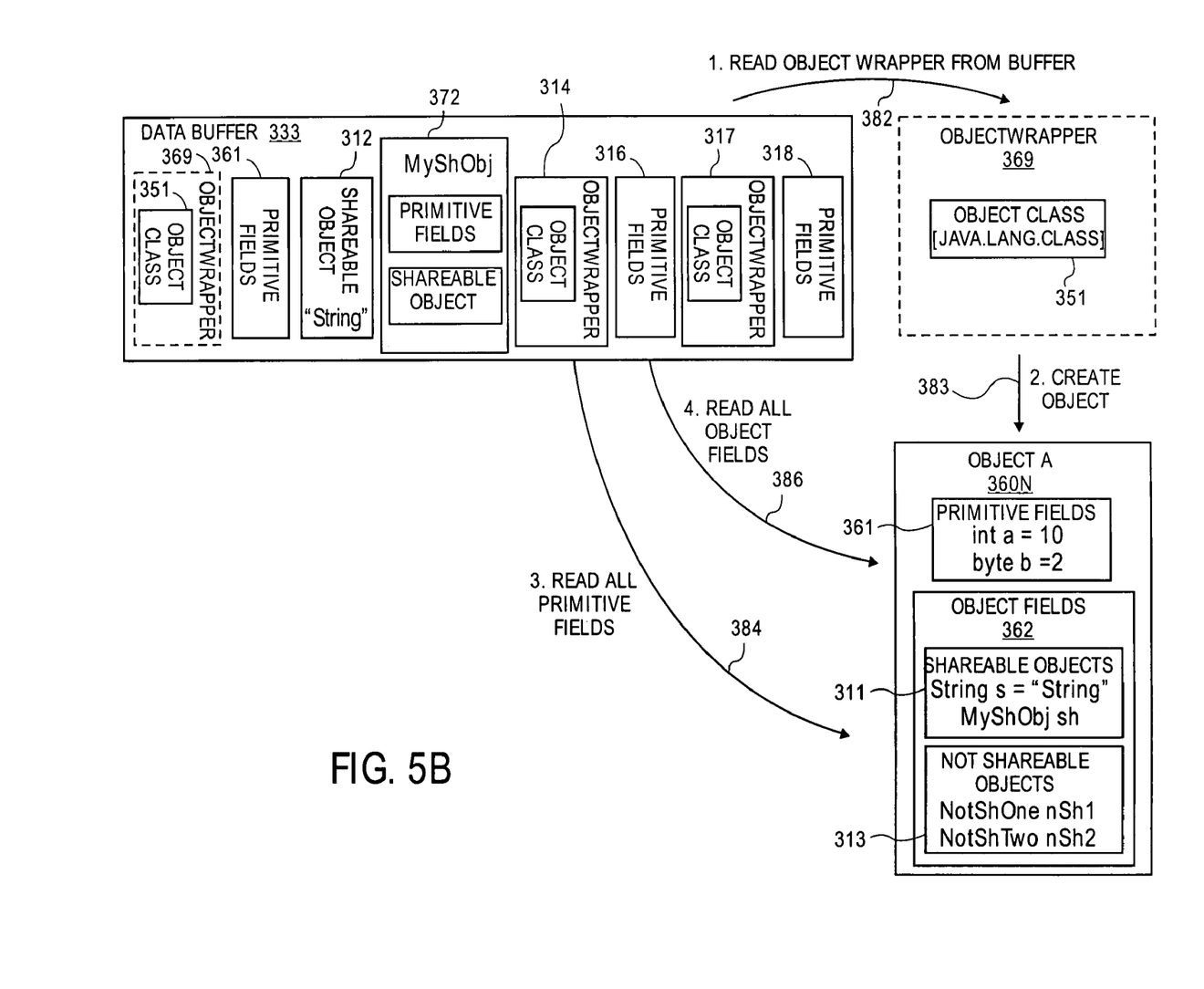
FIG. 5B illustrates the process by which a non-shareable object, existing in a data buffer is de-serialized and placed in a local memory.

Lastly, all object fields are read 386 from data buffer 333 to object 360N Beginning in order, string object 312 is read from data buffer 333. Next, MyShObj 372 is read from data buffer 333. The value of these fields is set to String S and sh, as seen in FIG. 4B. Note that these objects are shareable, so they are not required to pass through de-serializer 323. Hence, these two objects can be directly copied to local memory 320. Next, non-shareable object NotShOne 373 is read, in which the object read from data buffer 333 is wrapper object 314. First off an instance of this object is created. Second, the primitive fields 316 are read field by field. Here, when NotShOne 373 was serialized in FIG. 5A, it contained a transient field (e.g., transient byte b=2). Since the value of this field was not copied to primitive fields 316, its value is now "0" (e.g., transient byte b=0). This can be seen in FIG. 4B. Once the object wrapper 314 and all its primitive fields 316 are read, it is set to field nSh1 (as seen in FIG. 4B). Next non-shareable object NotShTwo 374 is read, in which the object read is wrapper object 317. Initially, an instance of this object is created and the fields are read in. Here, NotShTwo contains custom serialization, so the object fields are not directly read from deserializer 323, but the custom serialization method must be used instead. Hence deserializer 323 invokes readObject( ) method (shown in FIG. 4B), which reads an integer value of 5000 from buffer 333 and sets it to int a. Once the object wrapper 317 and all its primitive fields 318 are read, it is set to field nSh2 (as seen in FIG. 4B). At this point, object 360N and all its referenced objects have been completely read from data buffer 333 and placed in local memory 320.

Figure 6:
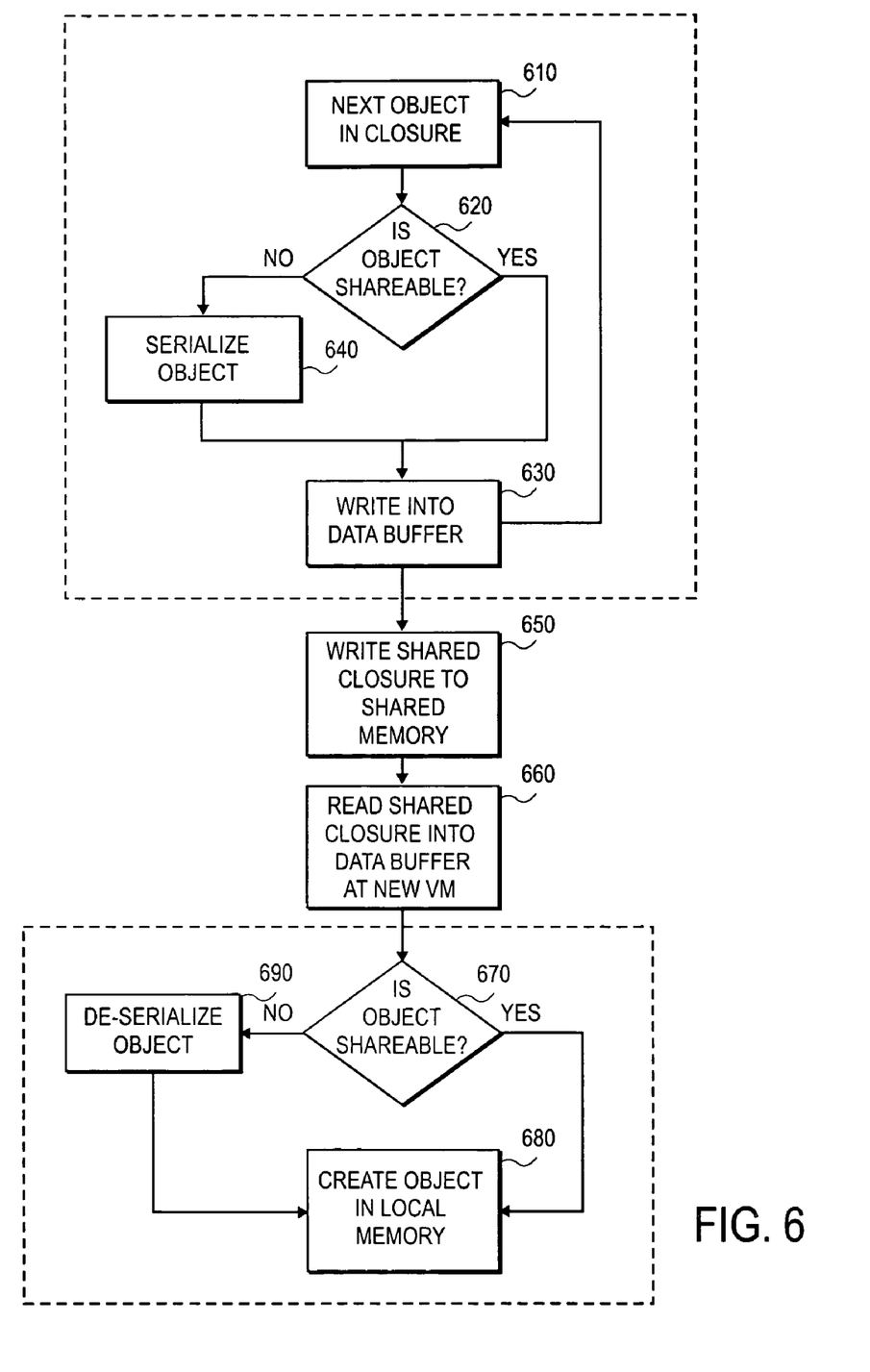
FIG. 6 illustrates a flowchart of the processes by which a closure of objects within a first local VM is placed in a data buffer, written to a shared memory and then read to a second local VM

FIG. 6 illustrates a flowchart of the processes by which a closure of objects, at least one of which is non-shareable, within a first local VM is placed in a data buffer, written to a shared memory and then read to a second local VM. There exists a closure of one of more objects, in the local memory of a first VM, which loops 610 through each object in the closure. For each object in the closure there is a single iteration of the loop. Next, a determination is made 620 as to whether the object is shareable. If the object is shareable (e.g., does not contain and transient fields, non-shareable object fields and/or custom serialization), it is directly written to 630 the data buffer. If the object is not shareable, the object is serialized 640 in order to remove all custom serialization, transient fields, and/or non-shareable object fields. Once serialized, the object is written to 630 the data buffer. This process occurs for each iteration of the loop.

Once all objects in the closure are written to the data buffer the entire shared closure is written 650 to shared memory. Next, the entire shared closure is written 660 to the data buffer of a second local VM. Another loop exists where each object in the closure is eventually written to the local memory of the second VM. Each iteration of the loop begins with a determination 670 of whether the object is shareable. If the object is shareable, it is written directly 680 to local memory. If the object is not shareable, the object is deserialized 690 in order to recreate a new version of the object. Lastly, a new version of the object is created in local memory.

The server may be Java 2 Enterprise Edition ("J2EE") server nodes which support Enterprise Java Bean ("EJB") components and EJB containers (at the business layer) and Servlets and Java Server Pages ("JSP") (at the presentation layer). Of course, other embodiments may be implemented in the context of various different software platforms including, by way of example, Microsoft.NET, Windows/NT, Microsoft Transaction Server (MTS), the Advanced Business Application Programming ("ABAP") platforms developed by SAP AG and comparable platforms.

Processes taught by the discussion above may be performed with program code such as machine-executable instructions, which cause a machine (such as a "virtual machine", a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 7:
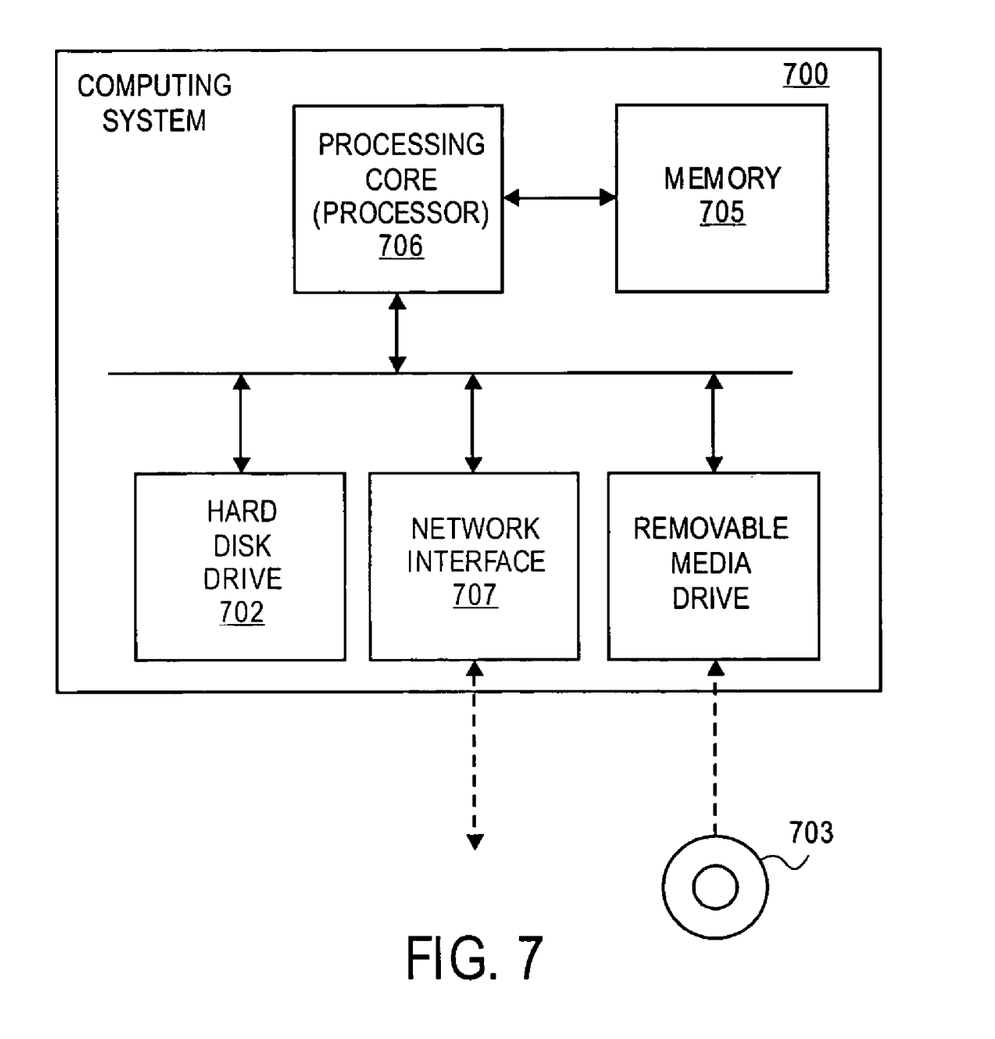
FIG. 7 illustrates a block diagram of a computing system that can execute program code stored by an article of manufacture.

FIG. 7 illustrates a block diagram of a computing system 700 that can execute program code stored by an article of manufacture. It is important to recognize that the computing system block diagram of FIG. 7 is just one of various computing system architectures. The applicable article of manufacture may include one or more fixed components (such as a hard disk drive 702 or memory 705) and/or various movable components such as a CD ROM 703, a compact disc, a magnetic tape, etc. In order to execute the program code, typically instructions of the program code are loaded into the Random Access Memory (RAM) 705; and, the processing core 706 then executes the instructions. The processing core may include one or more processors and a memory controller function. A virtual machine or "interpreter" (e.g., a Java Virtual Machine) may run on top of the processing core (architecturally speaking) in order to convert abstract code (e.g., Java bytecode) into instructions that are understandable to the specific processor(s) of the processing core 706.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   changing a non-shared closure to a shared closure having shareable objects by removing, from each non-shareable object in the non-shareable closure, content that causes each non-shareable object to be non-shareable, wherein the non-shared closure is in a shared memory, and wherein the shareable objects are accessible by at least one virtual machine;
   serializing, from the shared closure, each shareable object that was previously non-shareable; and
   de-serializing, from the shared closure, each shareable object that was previously non-shareable.

2. The method of claim 1, wherein the shareable closure further comprises one or more shareable objects that are not serialized and de-serialized.

3. The method of claim 1, wherein the serializing of each shareable object that was previously non-shareable further comprises placing each shareable object that was previously non-shareable in a first data buffer after the serializing.

4. The method of claim 3, wherein the de-serializing of each shareable object that was previously non-shareable further comprises removing each shareable object that was previously non-shareable from a second data buffer before the de-serializing.

5. The method of claim 1, further comprising:
   determining, from the shared closure, the contents of each shareable object that was previously non-shareable; and
   determining whether each shareable object that was previously non-shareable contains equal content before the serializing and after the de-serializing.

6. An article of manufacture including program code which, when executed by a machine, causes the machine to perform a method, the method comprising:
   changing a non-shared closure to a shared closure having shareable objects by removing, from each non-shareable object in the non-shareable closure, content that causes each non-shareable object to be non-shareable, wherein the non-shared closure is in a shared memory, and wherein the shareable objects are accessible by at least one virtual machine;
   serializing, from the shared closure, each shareable object that was previously non-shareable; and
   de-serializing, from the shared closure, each shareable object that was previously non-shareable.

7. The article of manufacture of claim 6, wherein the shareable closure further comprises one or more shareable objects that are not serialized and de-serialized.

8. The article of manufacture of claim 6, wherein the serializing of each shareable object that was previously non-shareable further comprises placing each shareable object that was previously non-shareable in a first data buffer after the serializing.

9. The article of manufacture of claim 8, wherein the de-serializing of each shareable object that was previously non-shareable further comprises removing each shareable object that was previously non-shareable from a second data buffer before the de-serializing.

10. The article of manufacture of claim 6, wherein the method further comprises:
    determining, from the shared closure, the contents of each shareable object that was previously non-shareable; and
    determining whether each shareable object that was previously non-shareable contains equal content before the serializing and after the de-serializing.

11. A computing system comprising a machine, the computing system also comprising instructions disposed on a computer readable storage medium, the instructions capable of being executed by the machine to perform a method, the method comprising:
    changing a non-shared closure to a shared closure having shareable objects by removing, from each non-shareable object in the non-shareable closure, content that causes each non-shareable object to be non-shareable, wherein the non-shared closure is in a shared memory, and wherein the shareable objects are accessible by at least one virtual machine;
    serializing, from the shared closure, each shareable object that was previously non-shareable; and
    de-serializing, from the shared closure, each shareable object that was previously non-shareable.

12. The computing system of claim 11, wherein the shareable closure further comprises one or more shareable objects that are not serialized and de-serialized.

13. The computing system of claim 11, wherein the serializing of each shareable object that was previously non-shareable further comprises placing each shareable object that was previously non-shareable in a first data buffer after the serializing.

14. The computing system of claim 13, wherein the de-serializing of each shareable object that was previously non-shareable further comprises removing each shareable object that was previously non-shareable from a second data buffer before the de-serializing.

15. The computing system of claim 11, wherein the method further comprises:
    determining, from the shared closure, the contents of each shareable object that was previously non-shareable; and
    determining whether each shareable object that was previously non-shareable contains equal content before the serializing and after the de-serializing.

* * * * *